United States Patent
Brinkman

(10) Patent No.: US 7,060,759 B2
(45) Date of Patent: Jun. 13, 2006

(54) URETHANE POLYMER COMPOSITIONS

(75) Inventor: Larry Frank Brinkman, Woodstock, IL (US)

(73) Assignee: Rohm and Haas Company, Philadelphia, PA (US)

( * ) Notice: Subject to any disclaimer, the term of this patent is extended or adjusted under 35 U.S.C. 154(b) by 251 days.

(21) Appl. No.: 10/382,781

(22) Filed: Mar. 6, 2003

(65) Prior Publication Data

US 2003/0181589 A1 Sep. 25, 2003

Related U.S. Application Data

(60) Provisional application No. 60/365,431, filed on Mar. 19, 2002.

(51) Int. Cl.
*C08L 75/04* (2006.01)
*C09J 175/04* (2006.01)

(52) U.S. Cl. .................. 525/454; 525/453; 525/460; 156/331.1; 156/331.7

(58) Field of Classification Search ............... 525/453, 525/454, 460; 156/331.1, 331.7
See application file for complete search history.

(56) References Cited

U.S. PATENT DOCUMENTS

| 4,198,488 | A | | 4/1980 | Drake et al. |
|---|---|---|---|---|
| 4,820,368 | A | * | 4/1989 | Markevka et al. ....... 156/307.3 |
| 5,470,907 | A | | 11/1995 | Wallon et al. |
| 5,589,028 | A | * | 12/1996 | Robinson et al. ........ 156/306.6 |
| 5,844,047 | A | | 12/1998 | Abend |
| 6,214,909 | B1 | | 4/2001 | Masuyama |
| 6,465,104 | B1 | | 10/2002 | Krebs et al. |
| 6,579,406 | B1 | | 6/2003 | Brinkman |
| 2001/0000789 | A1 | * | 5/2001 | Kotera et al. ................ 525/131 |

FOREIGN PATENT DOCUMENTS

| EP | 1153997 A1 | 8/1987 |
|---|---|---|
| EP | 0232055 B1 | 11/2001 |
| WO | WO 99/28363 | 6/1999 |

OTHER PUBLICATIONS

Machine translation of JP 05-179222, Jul. 1993, Matsui et al.*
"SMA®Resins," written and published by ATOFINA Chemicals, Philadelphia, PA, USA.

* cited by examiner

*Primary Examiner*—Jeffrey B. Robertson
(74) *Attorney, Agent, or Firm*—Catl P. Hemenway

(57) ABSTRACT

A moisture-reactive hot-melt adhesive composition is provided. Particularly, a composition that includes a polyol, an anhydride-functional polymer, and a polyisocyanate. Also provided are a method for forming the adhesive composition and a method for bonding substrates using the adhesive.

13 Claims, No Drawings

URETHANE POLYMER COMPOSITIONS

CROSS REFERENCE TO RELATED PATENT APPLICATION

This is a non-provisional application of prior pending U.S. provisional application Ser. No. 60/365,431 filed on Mar. 19, 2002.

BACKGROUND

This invention relates to urethane polymer compositions, particularly moisture-reactive hot-melt urethane polymer compositions useful as adhesives, to a method for making such compositions, and to a method for bonding substrates with such compositions.

U.S. Pat. No. 6,579,406 discloses moisture-reactive hot-melt adhesives that incorporate styrene/allyl alcohol addition copolymers into a polyurethane prepolymer-forming reaction mixture containing amorphous polyesters or polyethers. These adhesives achieve good "green strength" (i.e., adhesive strength prior to completion of the reaction with moisture), but alternative and/or additional ingredients are desired in order to adjust the formulation to achieve specific balance of properties.

The problem faced by the inventor is the provision of an alternative moisture-reactive hot-melt adhesive composition. Surprisingly, the inventor found that incorporation of anhydride-functional polymers provided the desired balance of properties.

STATEMENT OF THE INVENTION

In a first aspect of the present invention, there is provided a moisture-reactive hot-melt urethane polymer composition formed by admixing components comprising at least one polyol, at least one polyisocyanate, and at least one anhydride-functional polymer.

In a second aspect of the present invention, there is provided a method of making a moisture-reactive hot-melt polyurethane polymer composition comprising admixing components comprising at least one polyol, at least one polyisocyanate, and at least one anhydride-functional polymer.

In a third aspect of the present invention, there is provided a method for bonding substrates comprising
(a) making a moisture-reactive hot-melt polyurethane polymer composition by a method comprising admixing components comprising at least one polyol, at least one polyisocyanate, and at least one anhydride-functional polymer;
(b) heating said polymer composition;
(c) applying said heated polymer composition to a first substrate in the presence of moisture;
(d) contacting said applied heated polymer composition with a second substrate; and
(e) cooling, or allowing to cool, said polymer composition.

In a fourth aspect of the present invention, there is provided a moisture-reactive hot-melt urethane polymer composition formed by admixing components comprising at least one polyisocyanate and at least one anhydride-functional polymer with at least two hydroxyl functions.

DETAILED DESCRIPTION

The composition of this invention is a moisture-reactive hot-melt adhesive composition. By "moisture-reactive" is meant herein that the composition contains isocyanate groups which are capable of reacting with water desirably to effect an increase in the molecular weight of the adhesive composition and/or effect crosslinking of the adhesive composition so as to increase the strength properties of the adhesive subsequent to being contacted with water. By "hot-melt" is meant herein that the adhesive which may be a solid, semi-solid, or viscous mass can be advantageously heated to provide a fluid adhesive of a viscosity suitable for application to and adhesion to substrates.

The moisture-reactive hot-melt adhesive composition of the present invention is formed by admixing components which include at least one polyisocyanate, i.e., an isocyanate bearing at least two isocyanate groups. Polyisocyanates which may be used include aromatic, aliphatic, cycloaliphatic polyisocyanates, and combinations thereof, such as, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate, isophorone diisocyanate, 4,4',4"-triphenylmethane triisocyanate, polymethylene polyphenylene polyisocyanate, 2,4,6-toluene triisocyanate, 4,4'-dimethyl-diphenylmethane tetraisocyanate, prepolymers having Mn less than 2000 and bearing at least two isocyanate groups, and mixtures thereof. Preferred are 4,4'-diphenylmethane diisocyanate (also called 4,4'-MDI), 2,4'-diphenylmethane diisocyanate (also called 2,4'-MDI), and mixtures thereof; more preferred is a mixture of 2,4'-MDI and 4,4'-MDI; even more preferred is a mixture of 2,4'-MDI and 4,4'-MDI with a molar ratio of 2,4'-MDI to 4,4'-MDI between 0.5:1 and 2:1; most preferred is a molar ratio between 0.8:1 and 1.2:1.

The moisture-reactive hot-melt adhesive composition of the present invention is formed by admixing components which include at least one polyol. A polyol is a compound with two or more hydroxyl functions. Suitable polyols include a wide variety of compounds, some of which are described in *Polyurethane Handbook*, 2nd edition, edited by G. Oertel, Hanser Publishers, 1994. In addition to the hydroxyl functions, suitable polyols may contain other functionality, such as for example carbonyl, carboxyl, anhydride, unsaturation, or other functions. Suitable polyols include, for example, polyether polyols, polyester polyols, and mixtures thereof. Suitable polyol(s) may be independently selected from crystalline, semi-crystalline, or amorphous polyols.

Polyester polyols suitable for use in the present invention include those formed from diacids, or their monoester, diester, or anhydride counterparts, and diols. The diacids may be saturated $C_4$–$C_{12}$ aliphatic acids, including branched, unbranched, or cyclic materials, and/or $C_8$–$C_{15}$ aromatic acids. Examples of suitable aliphatic acids include, for example, succinic, glutaric, adipic, pimelic, suberic, azelaic, sebacic, 1,12-dodecanedioic, 1,4-cyclohexanedicarboxylic, and 2-methylpentanedioic acids. Examples of suitable aromatic acids include, for example, terephthalic, isophthalic, phthalic, 4,4'-benzophenone dicarboxylic, 4,4'-diphenylamine dicarboxylic acids, and mixtures thereof The diols may be $C_2$–$C_{12}$ branched, unbranched, or cyclic aliphatic diols. Examples of suitable diols include, for example, ethylene glycol, 1,3-propylene glycol, 1,2-propylene glycol, 1,4-butandediol, neopentyl glycol, 1,3-butandediol, hexanediols, 2-methyl-2,4-pentanediol, cyclohexane-1, 4-dimethanol, 1,12-dodecanediol, diethylene glycol, and mixtures thereof. Mixtures of the various suitable polyester polyols are also suitable for use in the present invention. The preferred polyester polyols are ortho phthalate-diethylene glycol based polyester polyols. The polyol(s) preferably has a weight-average molecular weight ("Mw" as measured by gel permeation chromatography), from 250 to 8,000, more preferably from 250 to 3,000, and preferably has an acid number less than 5, more preferably less than 2.

Polyether polyols suitable for use in the present invention include polyoxy-$C_2$–$C_6$-alkylene polyols, including branched and unbranched alkylene groups. Examples of suitable polyether polyols include, for example, reaction products of alkylene oxides with polyhydric alcohols, polyethylene oxide, poly(1,2- and 1,3-propyleneoxide), poly(1,2-butyleneoxide), random or block copolymers of ethylene oxide and 1,2-propylene oxide, and mixtures thereof Mixtures of the various suitable polyether polyols are also suitable for use in the present invention. The preferred polyether polyols are polypropylene glycols, also known as polypropyleneoxides. The polyether polyol preferably has a weight average molecular weight ("Mw" as measured by gel permeation chromatography), from 800 to 8,000, more preferably from 1,000 to 3,000.

The moisture-reactive hot-melt adhesive composition of the present invention is formed by admixing components which include at least one anhydride-functional polymer. By "anhydride-functional polymer" herein is meant a resin, oligomer, or polymer that contains anhydride groups. The molecules of the anhydride-functional polymer will have, on average, at least one anhydride functional group per molecule. The anhydride-functional polymer may also contain other functional groups such as for example hydroxyl or amide groups. If the anhydride-functional polymer contains multiple hydroxyl groups, it may also serve as the polyol in the practice of the present invention. Anhydride-functional polymers may be made by copolymerizing at least one vinyl monomer and at least one vinyl-containing anhydride monomer. Suitable vinyl monomers include, for example, hydrocarbon dienes, substituted dienes, acrylic and methacrylic acid, esters of acrylic and methacrylic acid, substituted esters of acrylic and methacrylic acid, styrene, substituted styrene, and mixtures thereof. Preferred is styrene. Suitable vinyl-containing anhydride monomers include, for example, maleic anhydride, alkene-substituted succinic anhydride, maleic anhydride adducts of methylcyclopentadienes, substituted versions thereof, and mixtures thereof. Preferred is maleic anhydride.

Included among the anhydride-functional polymers suitable for use in the present invention are olefin/maleic anhydride copolymers. Suitable olefin/maleic anhydride copolymers have an olefin/maleic anhydride molar ratio of 5/95 to 95/5, preferably 30/70 to 70/30, and more preferably 40/60 to 60/40. Suitable olefins include butenes, hexenes, decenes, diisobutylene, and the like. Preferred are 1-alkenes. Commercially available alkene mixtures containing 1-alkene compositions are also suitable. Suitable olefin/maleic anhydride copolymer additionally including minor amounts of other copolymerized monomers such as from 0–5 mole % copolymerized styrene or alkyl substituted styrenes wherein the alkyl groups are selected from C1 to C6 n-, i-, s-, or t-alkyl groups, as are chemically attainable, are included in the olefin/maleic anhydride copolymers herein. Such minor amounts of other copolymerized monomers are not included in the calculation of molar ratios of the olefin/maleic anhydride copolymer herein.

In the practice of the present invention, the preferred anhydride-functional polymers are copolymers of maleic anhydride with styrene, substituted styrene, or mixtures thereof More preferred are styrene/maleic anhydride copolymers, also called "styrene/maleic anhydride copolymer, resins" or "SMA Resins" or similar names. Styrene/maleic anhydride copolymers have been described in the publication "SMA Resins," available from Atofina Chemicals, Inc. By "styrene/maleic anhydride copolymer" herein is meant a copolymer containing at least 90 weight percent of copolymerized residues of styrene and maleic anhydride and containing from 0 to 10 weight percent of copolymerized residues of other monomers, based on the weight of the copolymer. Suitable styrene/maleic anhydride copolymers include styrene/maleic anhydride "base" copolymers, which are styrene/maleic anhydride copolymers that have not been modified by esterification or other chemical modifications; also included are "partially esterified" styrene/maleic anhydride copolymers, in which some of the anhydride groups have been reacted with organic alcohols to form carboxyl groups and ester groups; and also included are "fully esterified" styrene/maleic anhydride copolymers, in which all the anhydride groups have been reacted with organic alcohols. Preferred are partially esterified styrene/maleic anhydride copolymers.

In the practice of the present invention, suitable glass transition temperature for a styrene/maleic anhydride base copolymer is from 90° C. to 200° C., preferably from 110° C. to 160° C. Suitable glass transition temperature for a styrene/maleic anhydride partially esterified copolymer is from 40° C. to 150° C., preferably 50° C. to 100° C., and more preferably 55° C. to 65° C. Preferable molecular weight ("Mw" as measured by gel permeation chromatography) for a styrene/maleic anhydride base copolymer is from 3,000 to 15,000; more preferable is from 5,000 to 12,000. Suitable molecular weight for a styrene/maleic anhydride partially esterified copolymer is from 3,000 to 15,000, preferably from 5,000 to 12,000, and more preferably from 6,000 to 8,000.

In some embodiments of the present invention, the components include at least one hydroxyl-functional triglyceride of one or more fatty acids. Triglycerides of fatty acids are also called "fats" and are well known in the art, as described for example by R. T. Morrison and R. N. Boyd, in *Organic Chemistry*, 3rd edition, published by Allyn and Bacon, 1973. Triglycerides of fatty acids have the chemical formula $CH_2OR^1$—$HOR^2$—$H_2OR^3$, where $R^1$, $R^2$, and $R^3$ are residues of fatty acids, which may be the same or different. Fatty acid residues are generally straight-chain compounds with 3 to 18 carbon atoms, though some have longer chains. Most of the naturally occurring fats contain residues of fatty acids of several different lengths and/or compositions. Fatty acid residues may be saturated or unsaturated, and they may contain functional groups, including for example hydroxyl, that are either naturally occurring or that have been added. Hydroxyl-functional triglycerides of fatty acids suitable for use in the present invention have the chemical formula $CH_2OR^4$—$HOR^5$—$H_2OR^6$, where $R^4$, $R^5$, and $R^6$ are residues of fatty acids, which may be the same or different, at least one of which has hydroxyl functionality. Suitable hydroxyl-functional triglycerides of fatty acids include, for example, castor oil; esters of glycerol with hydroxyl-functional fatty acids; or hydroxylation products of triglycerides such as, for example, olive oil, soybean oil, triolein, or milkweed oil. The preferred hydroxyl-functional triglyceride of fatty acids is castor oil.

The components of the present invention contain less than 1% water, preferably less than 0.2% water, more preferably less than 0.1%, by weight based on the total weight of the components.

The components are mixed by conventional means, preferably in an inert, dry atmosphere, and reacted, preferably at a temperature of 50° C. to 120° C., preferably for a time sufficient to achieve a hydroxyl number of less than 25, more preferably for a time sufficient to achieve a hydroxyl number of less than 5. The anhydride-functional polymer is preferably solubilized by heating and mixing with at least one of the non-isocyanate containing components before the reaction with the polyisocyanate. Optionally, a catalyst such as, for example, a tertiary amine or a tin-based catalyst may be admixed with the components, either before, during, or after the reaction to form the adhesive composition. When such an optional catalyst is used, the usual use level is less than 0.3% by weight based on the total weight of the admixed components. The adhesive composition of this invention, which is an NCO-functional adhesive, is stored, preferably under an inert, dry atmosphere until use.

The hot-melt adhesive composition may be formulated by admixing additional conventional ingredients such as fillers, pigments, tackifiers, plasticizers, rheology modifiers, thermoplastic acrylic resins, etc. with due regard to the reactivity of the NCO-functional groups, which is desirably maintained.

A useful method of characterizing the adhesive composition of the present invention is the free NCO content. The free NCO content is the weight %, based on the total weight of the adhesive composition, of free NCO. Free NCO is the amount of NCO in excess of the amount needed to match the reactive H atoms present in the admixture on a 1:1 equivalents basis. Reactive H atoms are those believed to be likely to react fully or nearly fully with the NCO groups. Included in the reactive H atoms are those in hydroxyl groups and those in carboxyl groups. It is believed that, in some cases, the hydroxyl group on a polyol will react with an anhydride group on the anhydride-functional polymer to produce a carboxyl group and an ester linkage between the polyol and the anhydride-functional polymer. Those skilled in the art will recognize that this reaction, if it takes place, makes no net change in the number of reactive H atoms.

In the practice of the present invention, suitable admixtures have free NCO content of 0.2% to 15%, preferably 0.5% to 10%, more preferably 1% to 8%, and most preferably 2% to 4%. If the present invention is practiced in situations in which unusually high creep resistance (i e., the ability of the adhesive, after the moisture reaction has taken place, to resist deformation when exposed to stress over long periods of time) is desired, higher levels of free NCO content are preferred; to achieve unusually high creep resistance, free NCO content of 6% to 7% is most preferred.

In the method of the present invention for bonding substrates, the moisture-reactive hot-melt adhesive is heated in order to achieve a viscosity suitable for transporting the adhesive, such as by pumping or gravity feed, to the application equipment and for the application of the adhesive to a first substrate in the presence of moisture. The temperature should be high enough to achieve a suitable viscosity but low enough to avoid excessive degradation or other undesirable effects on the adhesive. Typical useful temperatures are in the range of 40° C. to 200° C., preferably 50° C. to 160° C., and more preferably 100° C. to 150° C.

The application of the adhesive may be effected by conventional means such as, for example, heated spray applicator, heated bead applicator, heated nozzle, and heated roll coater, to form a continuous or discontinuous film of adhesive, as desired. The adhesive may also be applied to the substrate by hand, for example with a hand-held tool such as for example a spatula or other applicator. The adhesive may typically be applied at a level of 50 to 250 g/m$^2$ (4–20 g/ft$^2$) although in cases where one of the substrates is a fabric it may be applied at a level as low as 1–50 g/m$^2$. It is contemplated that the moisture, i.e., water, which is anticipated to effect reaction with the NCO-functional groups thereby increasing the ultimate cohesive strength of the applied adhesive, may be, for example, a result of ambient humidity, artificially increased or controlled humidified air, a mist of water droplets, or a spray of liquid water contacting the applied adhesive. It is further contemplated that the moisture may be augmented by other NCO-functional group-reactive ingredients such as, for example, amines. It is also further contemplated that the reaction between the polymer composition and moisture may be augmented by the presence of a catalyst, as described herein above, in the admixture.

Then, the applied adhesive is contacted by a second substrate to provide a composite construction. Preferably, the adhesive is contacted by the second substrate while the adhesive has a temperature substantially above room temperature. The composite construction so formed is optionally subjected to applied pressure such as by passing it between rollers to effect increased contact of the substrates with the adhesive, and the composite construction is then cooled or allowed to cool. In another embodiment the adhesive may be simultaneously or sequentially applied to two surfaces of the first substrate, which adhesive-coated surfaces are then simultaneously or sequentially bonded to two further substrates, which may be the same or different. It is further contemplated that the composite construction may subsequently be bonded to other substrate(s) using the same or a different adhesive before or after the process described herein. The substrates to be bonded in the method of this invention may be the same or different and include, for example, metal, wood, consolidated wood products, paper, elastomers, woven and nonwoven fabrics, and plastics which may have smooth or structured surfaces and are provided in the form of rolls, sheets, films, foils, etc. They include, for example, lauan mahogany plywood, impregnated paper, extruded polystyrene foam, expanded polystyrene foam, fiberglass reinforced polyester, polyester fabric, high or low pressure laminate, plywood, aluminum, steel, polyvinyl chloride, synthetic rubber, polymer blends, and engineering plastics.

In some embodiments of the present invention, the substrates that are bonded are relatively thin and flat, and in such cases the composite article is a called a laminate or laminated structure.

It is to be understood that for purposes of the present specification and claims that the range and ratio limits recited herein can be combined. For example, if ranges of 90 to 200 and 110 to 160 are recited for a particular parameter, it is understood that the ranges of 90 to 160 and 110 to 200 are also contemplated.

The following examples are presented to illustrate the invention and the results obtained by the test procedures.

Abbreviations

DEG-PA =diethyleneglycol-phthalic anhydride

PPG =polypropylene glycol

MDI =diphenylmethane diisocyanate

Test Procedures

Viscosity: The adhesive was heated to 100° C. A small portion was extracted with a hand-held spatula and spread onto a flat substrate such as Luaun wood. If the adhesive spreads easily and does not run off the substrate, the viscosity was judged "good." If the spreading requires somewhat higher effort, the viscosity was judged "slightly high" but was still considered acceptable.

Adhesion: Adhesive was spread onto one substrate as in the Viscosity test. While it was still hot, a second substrate was pressed onto the adhesive, and the composite was stored under ambient laboratory conditions for 24 to 48 hours. The pieces of substrate were then forced apart in a cleavage mode, and the mode of failure was observed. If one or both pieces of substrate was destroyed while the adhesive and its interfaces with substrate remained intact, adhesion was judged to be "excellent."

Bonding: Adhesives were spread on substrates either by hand or with a mechanical roll-coater. Laminates were formed as in the Adhesion test described above. Laminates were then forced apart by hand, using hand tools such as for example pliers and/or a chisel to force the layers apart. Laminates are considered "bonded" if the adhesive and its interfaces with the substrates remain intact while at least one of the substrates fails, for example by breaking and/or delaminating.

EXAMPLES

Example 1

A one liter reaction vessel was set up with, a gas inlet tube, thermometer, stirrer and a heating jacket. 10 g styrene/maleic anhydride partially esterified copolymer (Mw approximately 7000, Atofina Chemicals, SMA 1440), 20 g. PPG 1025 (Mw approximately 1,000, BASF Corp.), and 15 g. castor oil (Caschem) were added to the reaction vessel, and the temperature was raised to 110° C. with stirring. After 30 minutes at 110° C. and a vacuum of 711 mm (28 inches) of mercury, the temperature was lowered to 80° C. 105 g of a mixture of 2,4'-MDI and 4,4'-MDI (1:1 mole ratio, BASF Corp.) was added, and the temperature was held at 80–100° C. for one hour with stirring and under 711 mm (28 inches) of mercury. 270 g. of DEG-PA polyester (hydroxyl number approximately 56) (Stepanpol™ PD-56, Stepan Chemical) was added, and the reaction temperature was held at 80–100° C. for an additional hour with stirring under vacuum of 711 mm of mercury (28 inches) of mercury. At this time the reaction product was poured from the vessel hot, into a container which was then blanketed in dry nitrogen and sealed.

Example 2

Using the procedures of Example 1, another preparation was made with the following proportions:

| Ingredient | Dry Weight % |
| --- | --- |
| SMA 1440 | 2 |
| PPG 1025 | 23.3 |
| MDI mixture | 20.7 |
| PD56 | 54 |

Example 3

Using the procedures of Example 1, another preparation was made with the following proportions:

| Ingredient | Dry Weight % |
| --- | --- |
| SMA 1440 | 2 |
| PPG 1025 | 19.7 |
| PEG 1000 MW | 4 |
| MDI mixture | 203 |
| PD56 | 54 |

Example 4

Using the procedures of Example 1, another preparation was made with the following proportions:

| Ingredient | Dry Weight % |
| --- | --- |
| SMA 1440 | 2 |
| PPG 1025 | 20.5 |
| Poly BD R45 HT | 4 |
| MDI mixture | 19.5 |
| PD56 | 54 |

Poly BD R45 HT is hydroxyl terminated polybutadiene, from Elf Atochem.

Example 5

Using the procedures of Example 1, another preparation was made with the following proportions:

| Ingredient | Dry Weight % |
| --- | --- |
| SMA 1440 | 2 |
| PPG 1025 | 20 |
| Castor Oil | 3 |
| MDI mixture | 21 |
| Benzoflex ™ 9-88 | 3 |
| PD56 | 51 |

Benzoflex ™ 9-88 is a benzoic acid ester, considered to be a plasticizer, from Velsicol Chemical Corporation.

Example 6

Using the procedures of Example 1, another preparation was made with the following proportions:

| Ingredient | Dry Weight % |
| --- | --- |
| SMA 1440 | 2 |
| PPG 1025 | 19.2 |
| PEG 1000 MW | 2 |
| Morflex ™ C-2 | 2 |
| MDI mixture | 20.8 |
| PD56 | 54 |

Morflex ™ C-2 is a triethyl citrate plasticizer, from Morflex, Inc.

Example 7

Using the procedures of Example 1, another preparation was made with the following proportions:

| Ingredient | Dry Weight % |
|---|---|
| SMA 1440 | 2 |
| PPG 1025 | 20.6 |
| 1,4 butanediol | 2 |
| MDI mixture | 26.4 |
| PD56 | 40 |

Example 8

Viscosity Tests

Examples 1–4 were tested for viscosity, and all had acceptable viscosity. The results were as follows:

| Example Number | Viscosity |
|---|---|
| 1 | slightly high |
| 2 | good |
| 3 | good |
| 4 | good |

Example 9

Further Viscosity Tests

Examples 5–7 are tested for viscosity, and the results are as follows:

| Example Number | Viscosity |
|---|---|
| 5 | good |
| 6 | good |
| 7 | good |

Example 10

Adhesion Tests

Examples 1–4 were tested for quality of adhesion, and the results were as follows:

| Example Number | Adhesion |
|---|---|
| 1 | excellent |
| 2 | excellent |
| 3 | excellent |
| 4 | excellent |

Example 11

Bonding Tests

Examples 5–7 were tested for bonding. The adhesive of Example 5 was applied to substrates with a mechanical heated roll-coater, while the adhesives of Examples 6 and 7 were hand applied to substrates. The results were as follows:

| Example Number | Substrates | Bonding Result |
|---|---|---|
| 5 | wood to wood | bonded |
| 5 | PVC to wood | bonded |
| 5 | aluminum to wood | bonded |
| 5 | aluminum to extruded polystyrene foam | bonded |
| 5 | aluminum to expanded polystyrene foam | bonded |
| 6 | ABS (acrylonitrile butadiene styrene) to synthetic rubber | bonded |
| 7 | wood to wood | bonded |

I claim:

1. A method of making a moisture-reactive hot-melt polyurethane polymer composition comprising admixing components comprising at least one polyol, at least one polyisocyanate, and at least one anhydride-functional polymer, wherein said components have free NCO content of at least 0.5% by weight based on the weight of said components, and wherein said anhydride-functional polymer comprises at least one partially esterified styrene/maleic anhydride copolymer with weight-average molecular weight between 5,000 and 15,000.

2. A moisture-reactive hot-melt urethane polymer composition formed by the method of claim 1.

3. The polymer composition of claim 2 wherein said polyisocyanate comprises 2,4' diphenylmethane diisocyanate and 4,4' diphenylmethane diisocyanate.

4. The polymer composition of claim 2 wherein said components additionally comprise at least one hydroxyl-functional triglyceride of fatty acids; wherein said polyol comprises at least one polyester polyol and at least one polyether polyol; wherein said polyisocyanate comprises 2,4' diphenylmethane diisocyanate and 4,4' diphenylmethane diisocyanate.

5. The method of claim 1, wherein said components additionally comprise at least one hydroxyl-functional triglyceride of fatty acids; wherein said polyol comprises at least one polyester polyol and at least one polyether polyol; wherein said polyisocyanate comprises 2,4' diphenylmethane diisocyanate and 4,4' diphenylmethane diisocyanate.

6. A method for bonding substrates comprising
   (a) making a moisture-reactive hot-melt polyurethane polymer composition by the method of claim 1;
   (b) heating said polymer composition;
   (c) applying said heated polymer composition to a first substrate in the presence of moisture;
   (d) contacting said applied heated polymer composition with a second substrate; and
   (e) cooling, or allowing to cool, said polymer composition.

7. The method of claim 6 wherein said components additionally comprise at least one hydroxyl-functional triglyceride of fatty acids; wherein said polyol comprises at least one polyester polyol and at least one polyether polyol;

wherein said polyisocyanate comprises 2,4' diphenylmethane diisocyanate and 4,4' diphenylmethane diisocyanate.

8. A moisture-reactive hot-melt urethane polymer composition formed by admixing components comprising
   (a) at least one polyisocyanate and
   (b) at least one anhydride-functional polymer having at least two hydroxyl functions.

9. A method of making a moisture-reactive hot-melt polyurethane polymer composition comprising admixing components comprising at least one polyol, at least one polyisocyanate, and at least one anhydride-functional polymer, wherein said components have free NCO content of at least 0.5% by weight based on the weight of said components, and wherein said polyol comprises at least one polyester polyol or at least one polyether polyol or a mixture thereof.

10. A moisture-reactive hot-melt urethane polymer composition formed by the method of claim 9.

11. The polymer composition of claim 10, wherein said polyol comprises at least one polyester polyol and at least one polyether polyol, and wherein said components additionally comprise at least one hydroxyl-functional triglyceride of fatty acids.

12. The moisture-reactive hot-melt urethane of claim 10, wherein said components have free NCO content of at least 6% by weight based on the weight of said components.

13. A method for bonding substrates comprising
   (a) making a moisture-reactive hot-melt polyurethane polymer composition by the method of claim 9;
   (b) heating said polymer composition;
   (c) applying said heated polymer composition to a first substrate in the presence of moisture;
   (d) contacting said applied heated polymer composition with a second substrate; and
   (e) cooling, or allowing to cool, said polymer composition.

* * * * *